(12) United States Patent
Mako et al.

(10) Patent No.: US 8,337,648 B2
(45) Date of Patent: *Dec. 25, 2012

(54) CERAMIC JOINING

(75) Inventors: Frederick M. Mako, Fairfax Station, VA (US); Robert L. Bruce, Arlington, VA (US)

(73) Assignee: F.M. Technologies, Inc., Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/773,516

(22) Filed: Feb. 5, 2004

(65) Prior Publication Data

US 2004/0154725 A1     Aug. 12, 2004

Related U.S. Application Data

(63) Continuation of application No. 10/002,801, filed on Dec. 3, 2001, now Pat. No. 6,692,597.

(51) Int. Cl.
C03B 29/00  (2006.01)

(52) U.S. Cl. .................................................. 156/89.11

(58) Field of Classification Search ............... 156/89.11, 156/293, 294, 304.1, 304.2, 304.3, 304.5, 156/304.6
See application file for complete search history.

(56) References Cited

U.S. PATENT DOCUMENTS

| | | | | |
|---|---|---|---|---|
| 2,319,323 A | * | 5/1943 | Heyroth | 338/329 |
| 2,972,808 A | * | 2/1961 | Litton | 228/124.6 |
| 3,657,592 A | * | 4/1972 | Kellar | 313/357 |
| 4,070,197 A | * | 1/1978 | Coes | 428/34.4 |
| 4,762,269 A | * | 8/1988 | Gyarmati et al. | 228/194 |
| 4,783,229 A | * | 11/1988 | Mizuhara | 156/89.24 |
| 4,810,836 A | * | 3/1989 | Shinoda et al. | 174/139 |
| 4,942,145 A | * | 7/1990 | Moehle et al. | 501/90 |
| 5,139,594 A | * | 8/1992 | Rabin | 156/89.25 |
| 5,407,504 A | * | 4/1995 | Ewart-Paine | 156/89.25 |
| 5,569,423 A | * | 10/1996 | Belunova et al. | 264/123 |
| 6,165,301 A | * | 12/2000 | Henager et al. | 156/89.11 |
| 6,214,472 B1 | * | 4/2001 | Barton et al. | 428/446 |
| 6,494,979 B1 | * | 12/2002 | DiChiara, Jr. | 156/89.11 |
| 6,692,597 B2 | * | 2/2004 | Mako et al. | 156/89.11 |

FOREIGN PATENT DOCUMENTS

| | | | |
|---|---|---|---|
| DE | 26 04 171 | * | 8/1977 |
| GB | 2 137 975 | * | 10/1984 |
| JP | 57-67083 | * | 4/1982 |
| JP | 60-122774 A | * | 7/1985 |
| JP | 63-129078 | * | 6/1988 |
| JP | 3-88781 | * | 4/1991 |
| JP | 6-256067 | * | 9/1994 |
| JP | 6-329477 | * | 11/1994 |

* cited by examiner

*Primary Examiner* — Michael Orlando
(74) *Attorney, Agent, or Firm* — Ansel M. Schwartz

(57) ABSTRACT

A method for the production of joints between ceramic bodies such as silicon carbide bodies in which a preceramic polymer mixed with a powder, such as bimodal silicon carbide, is applied in slurry form. The mechanical and hermetic properties may be enhanced by the inclusion of additional bodies constraining the polymer slurry in the joint region, such as a collar. The thermal processing of the joint is described which provides a useful joint.

4 Claims, 6 Drawing Sheets

Tapered 3D Joint

Tapered 3D Joint

CERAMIC JOINING

This application is a continuation of applications application Ser. No. 10/002,801 filed on Dec. 3, 2001 now U.S. Pat. No. 6,692,597.

FIELD OF THE INVENTION

The invention is in the field of ceramic materials and processes. More specifically, this invention is directed to an assembly comprising two or more silicon carbide bodies, material in or near contact with these bodies, and materials confining the aforementioned items, as well as to the process by which these materials are converted to the finished joint, and to the joint member made from these materials.

BACKGROUND OF THE INVENTION

In applications where reliability at high temperatures is required, metal structures have their limits. Ceramics, unlike metals, can maintain their reliability above the temperature limit of metals. If ceramics could be made into complex shapes and large sizes, with the relative ease that metal structures can be made, then ceramics could replace metals in applications that would benefit from the higher temperatures that ceramics can achieve.

Making ceramics into complex shapes and large sizes is difficult. Ceramics are hard and brittle, so that where metals can be regularly machined into complex shapes and formed in large sizes; ceramics are normally made in simple shapes and small sizes to avoid the difficulties of machining and forming in ceramics. However, if ceramics were joined, then the simple shapes and small sizes of produced ceramics could be joined together to achieve the complex shapes and large sizes that metals can have.

Joining ceramics that are reliable at high temperatures has difficulties. Ceramics can be diffusion bonded, a method of reaching a processing temperature close to the melting point of the ceramic so that both sides of the joint diffuse into one another. However, it is expensive to reach temperatures close to the melting point of ceramics and the ceramic can become weak or slag at these extreme temperatures. Joining with metal braze imparts metallic impurity into the joint that may corrode and contaminate. Also, the mismatch in coefficient of thermal expansion causes high stress in the joint at high temperatures. Using preceramic polymers to form a joint between two ceramics can be accomplished at temperatures comparable to the application-specific service temperature of the ceramic and converts to ceramic, so there are no issues of thermal mismatch and contamination.

For silicon carbide, preceramic polymers such as allylhydridopolycarbosilane, polyborosiloxane, and polysilazane are used to join silicon carbide together. The polymers, however, exhibit shrinkage during conversion of the polymer to ceramic. This brings high stresses to the joint and the joint becomes very porous and large cracks are formed. To make an effective joint, multiple infiltrations of the polymer can form a denser interlayer. For most preceramic polymers, 8-10 infiltrations is normally required to produce a strong joint. Because infiltrations are time-consuming, filler materials can be used to reduce the amount of infiltrations to produce a strong joint. Filler materials, such as silicon carbide powder, can be used to reduce the volume shrinkage of the polymer during conversion. However, filler materials can be ineffective since they become stationary inside the polymer before conversion into ceramic, thus rendering them inactive in filling pores when the polymer experiences shrinkage later in processing.

The thickness of the preceramic polymer will determine the strength of the joint as well. Therefore, tight tolerances are normally held in the joint components and even surface roughness can affect the effectiveness of the joint. Heavy machining and mirror polished flats are made to reduce the thickness of the joint material to create a strong joint.

SUMMARY OF THE INVENTION

The subject invention relates to a method for joining bodies of ceramic, such as silicon carbide to silicon carbide, by the pyrolysis of a prescribed thickness of a slurry composed of a mixture of a preceramic polymer with a multi-modal silicon carbide powder. The slurry is converted to ceramic during a heating and cooling cycle and forms a tightly bound transition layer in the joint. The joint is enhanced by the inclusion of alignment geometry in the bodies to be joined. The joint is enhanced by the constraint of the slurry to the joint region by a capture geometry of the ceramic bodies.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
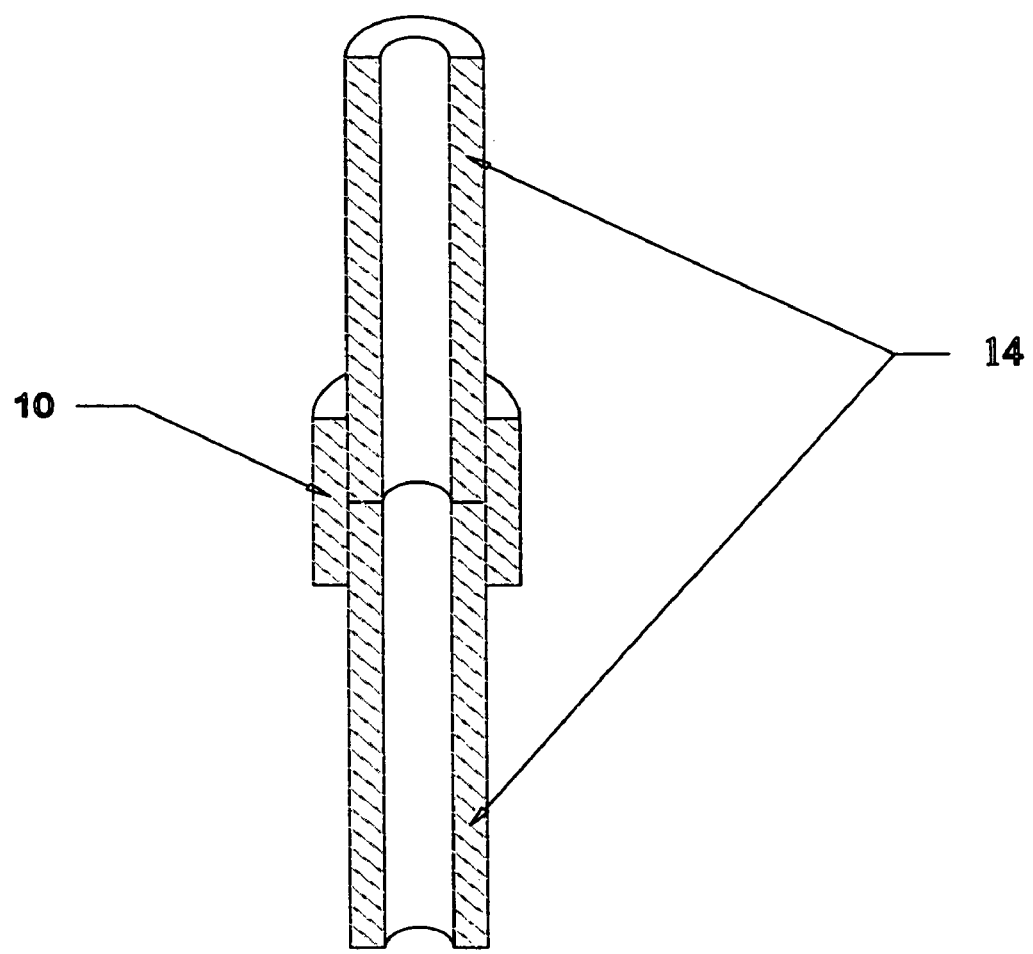
FIG. 1 is a cross-sectional view of a collar around ceramic bodies.
Figure 2:
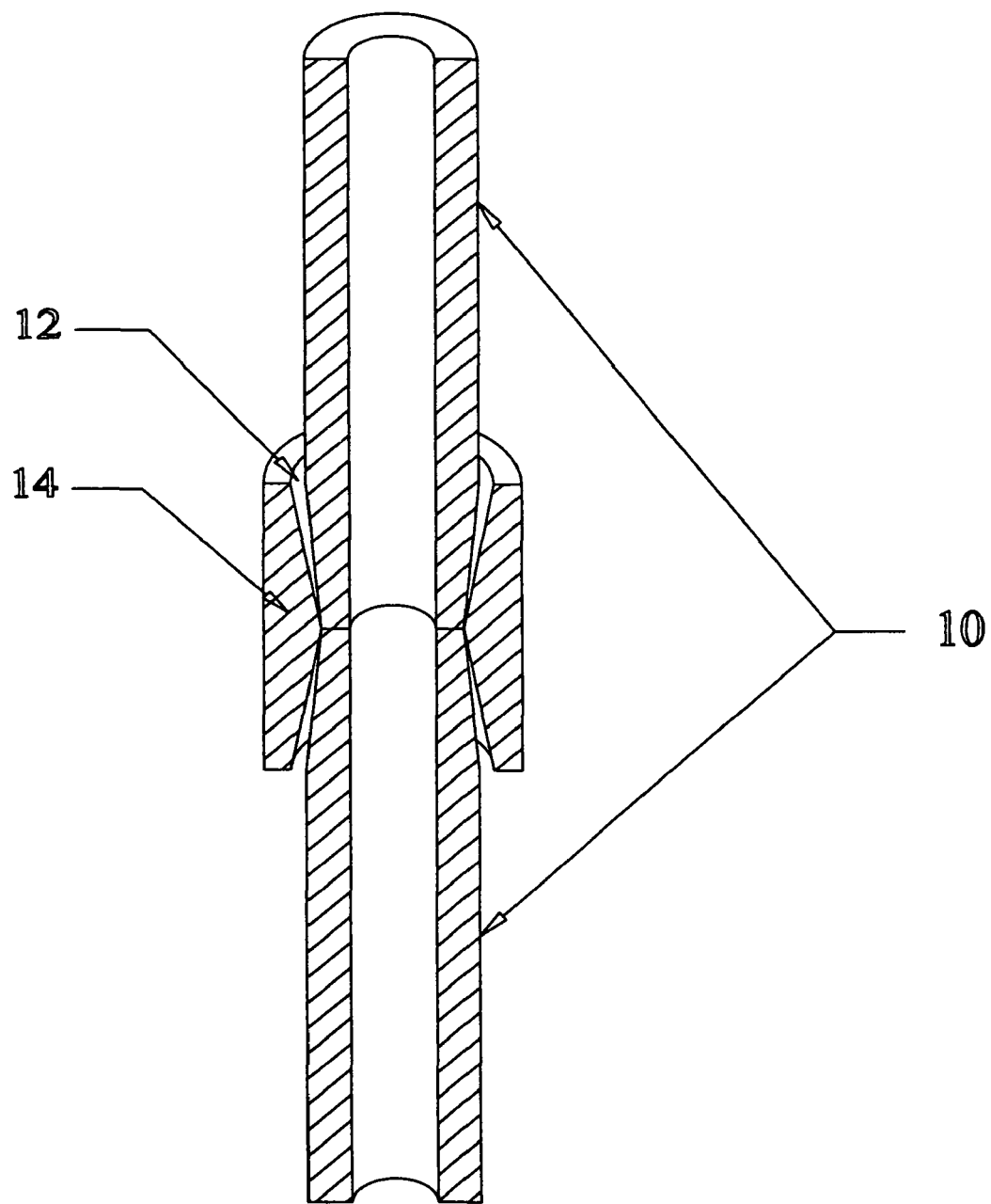
FIG. 2 is a cross-sectional view of a collar with a greater taper angle and ceramic bodies with a lesser taper angle.
Figures 3A, 3B:
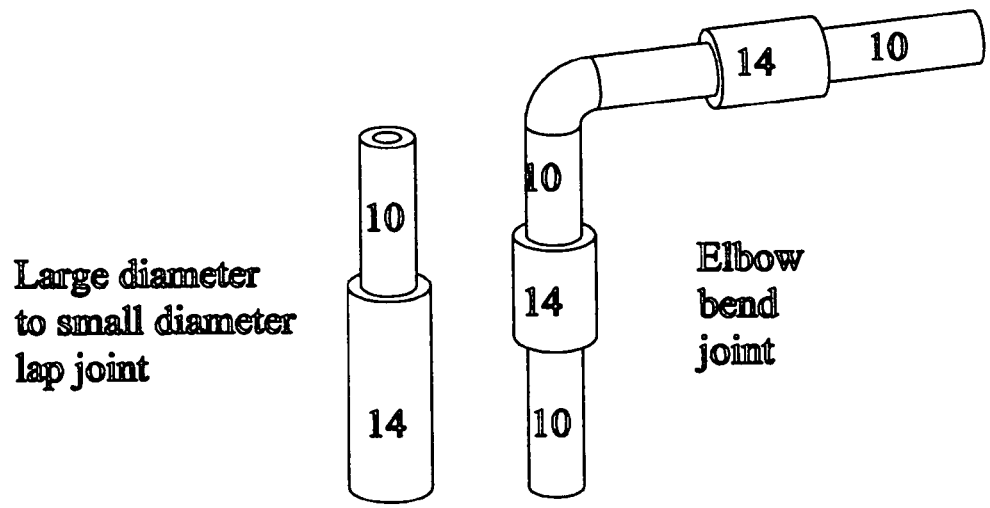
FIG. 3*a* is a perspective view of a large diameter to small diameter lap joint.
FIG. 3*b* is a perspective view of an elbow bend joint.
Figures 3C, 3D:
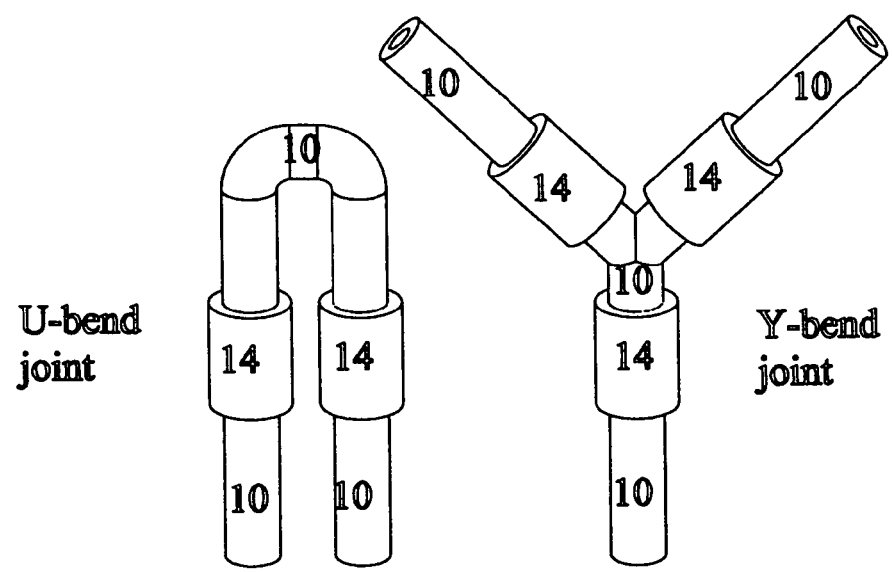
FIG. 3*c* is a perspective view of U bend joint.
FIG. 3*d* is a perspective view of a Y bend joint.
Figure 4A:
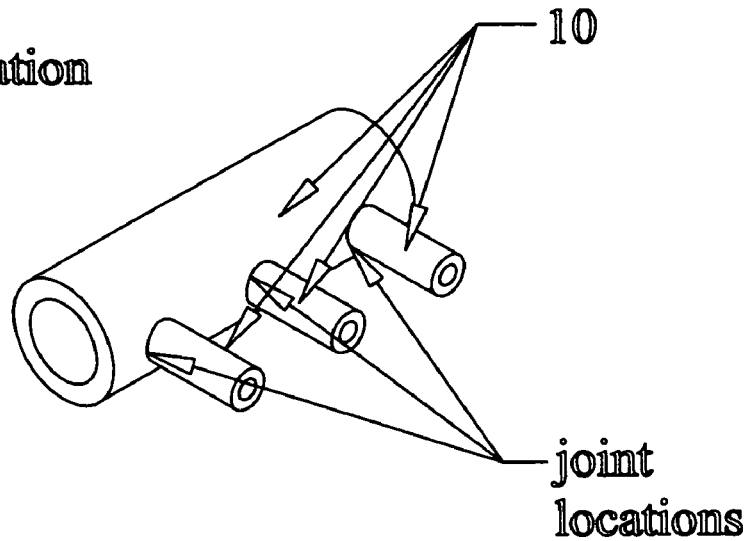
FIG. 4*a* is a perspective view of a large pipe connected to smaller pipes.
Figure 4B:
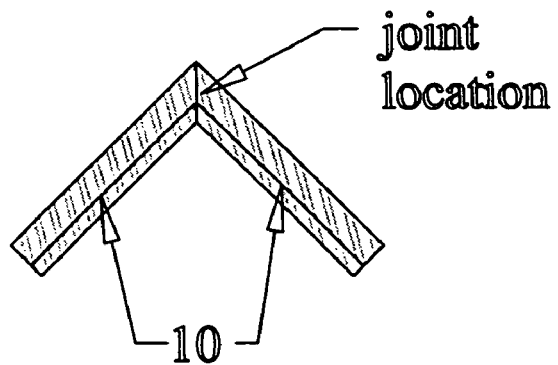
FIG. 4*b* is a perspective view of a corner.

The forms of silicon carbide bodies 10 capable of being joined by the described method include plate, rod, ball, tube, and others. These bodies 10 may be joined to either similar or dissimilar silicon carbide forms. (FIGS. 1-4*b*)

Combinations of silicon carbide bodies 10 joined by this technique require only a close fit with a thin layer of the slurry 12 between them. The assembly is joined by pyrolyzing the slurry 12 by heating. Many tube assembly geometries are possible, including, but not limited to, those of FIGS. 1-4. Additionally, the joining of multiple silicon carbide pieces onto a single silicon carbide piece is considered. This allows, for example, the assembly of a structure consisting of a header with multiple tubes attached as in FIG. 4.

The slurry 12 is composed of a mixture of a preceramic polymer with a multi-modal silicon carbide powder. The multi-modal powder is composed of a mixture of two or more silicon carbide particle sizes. The slurry 12 is applied thinly between the ceramic bodies 10 to be joined. The slurry 12 is converted to ceramic during a heating and cooling cycle and forms a tightly bound transition layer in the joint. The heating and cooling rates associated with the pyrolysis of the slurry 12 are important to ensure a useful joint.

To insure that the ceramic bodies 10 are aligned properly with respect to each other and to the joint, the geometry of the ceramic bodies 10 may be modified by the use of a taper. This taper may be in an additional body besides those bodies 10 to be joined, or the taper may be included in the joining bodies 10.

To provide for the slurry 12 to be in good contact with the joint interface, the geometry of the ceramic bodies 10 in or near contact with the joint interface may be modified. A capture geometry may be devised to (1) constrain the slurry 12 in the region between the ceramic bodies 10 to be joined, and (2) provide a reservoir of slurry 12 which may flow into in the region between the ceramic bodies 10 to be joined when vacuum is applied. The capture geometry and alignment geometries may be combined, and in some cases may be identical.

To make a joint with both an alignment and capture geometry, the collar 14 is machined with an inner taper that is 2 degrees halfway through on both ends of the collar 14 and the tubes are machined with outer tapers that are 1 degree at the ends that are intended to be joined. The outer tapers at the tube ends go as deep as one inner taper on the collar 14 that was machined halfway through. When the tube ends are joined to the collar 14, the tapers provide alignment during heating and also a reservoir for bonding slurry 12. Because of the shallower taper angle on the tube ends compared to the collar 14, there is a volume between the tapers that acts as reservoir for the bonding slurry 12.

This joint can be achieved at a low temperature relative to a diffusion bond, which occurs at approximately 2200° C. The joint may be achieved anywhere in the range from 850° C. up to 1400° C., which the higher temperature joints achieving greater strength.

There are a variety of applications for silicon carbide joints, which depend upon the outstanding thermal, chemical, and mechanical properties of silicon carbide. Many configurations of silicon carbide assemblies are possible, some of which are described below. This invention allows for the possibility of larger structures and longer tubes of silicon carbide than could otherwise be readily manufactured.

Figure 5:
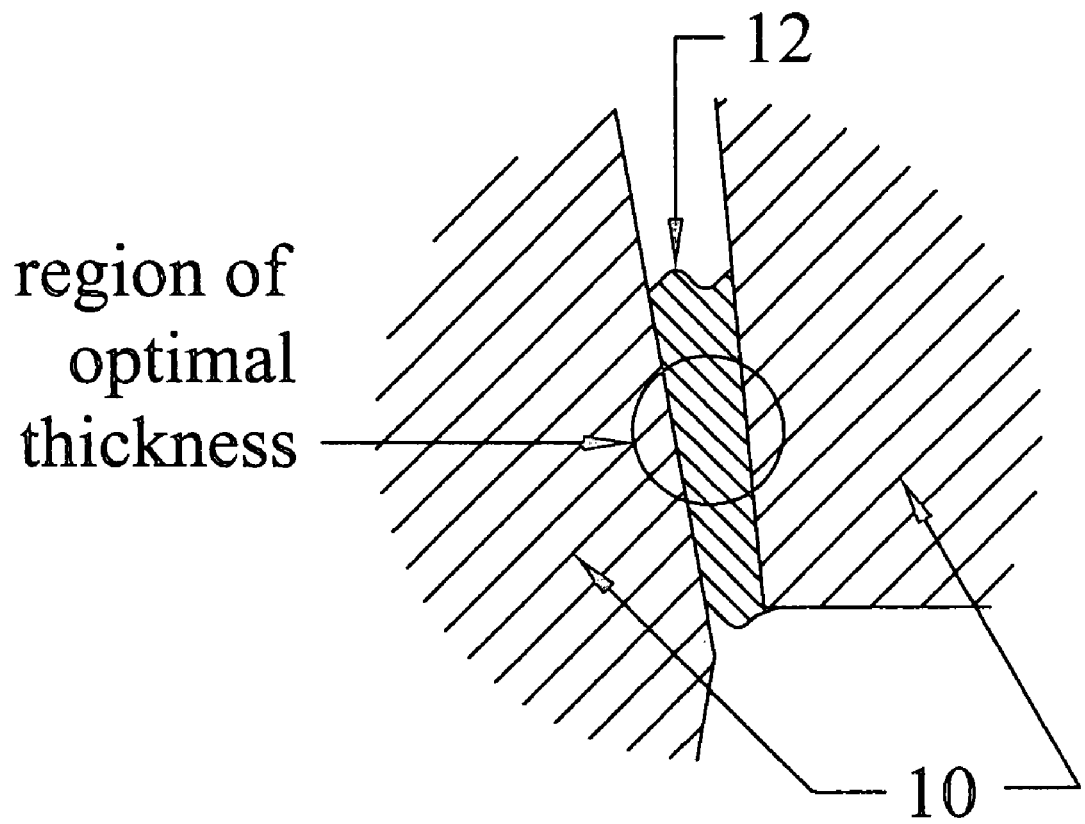
FIG. 5 is a representation of a joint.

The three-dimensional joint consisting of a butt plus lap joint contributes to a greater overall strength of the joined geometry than a butt only joint. The inclusion of capture tapers (FIG. 2) in the creation of the joint facilitates stronger joints by allowing the application of an appropriately thin coating of slurry 12. As shown in FIG. 5, where the angle of the interior body is inclined at a lesser angle than the exterior body, the slurry 12 is filled between the bodies 10. There exists a region of optimal thickness where the slurry 12 is polymerized in an optimal manner.

The inclusion of alignment tapering allows for the structure to be self aligning and provide for a self supporting joint. The joint may be self locking, or taper locked, in that the friction from surface contact holds the relative alignment of the bodies 10 during processing. The slurry 12 composed of AHPCS and the bimodal silicon carbide powder, when heated, both joins the silicon carbide bodies 10 and sinters to become a form of silicon carbide itself. There is no contamination introduced for such a joint. If the slurry 12 includes an active filler material, which melts at the processing temperature, the hermeticity of the joint is enhanced by filling of the pores in the silicon carbide produced via pyrolysis. The slurry 12 is highly viscous and does not flow to any appreciable extent under normal conditions. The flow may be enhanced by application of vacuum suction during assembly. This allows flexibility in the orientation of the joint during processing.

The tube/tube silicon carbide joint is of particular interest in industrial application. Silicon carbide tube assemblies become feasible, including: construction of long tubes; connection of tubes to flanges or bends; or multiple tube joints with single or multiple opening headers. These components incorporating these configurations include, for example, furnace coil assemblies for insertion into chemical processing facilities such as those used for the high temperature heat transfer processes.

The most important function of a joint between two tubes is the reliable separation of the environment interior to the tube wall from the environment exterior to the tube wall. We refer to the separation of materials interior and exterior to the tube wall as the hermetic property. It is also desirable that the thermal and mechanical properties of the joined tube assembly not be significantly impaired from that of the basic tube by the joint itself.

One object of the invention is to provide an improved method for the production of silicon carbide tube assemblies, which allows the temperature of operation to be high. Many tube assembly geometries are envisioned, including, but not limited to, those of FIGS. 1-4b. Additionally, the joining of multiple silicon carbide pieces onto a single silicon carbide piece is considered. This allows, for example, the assembly of a structure consisting of a header with multiple tubes attached as in FIG. 4a.

The subject invention contains a method for bonding ceramic tubes that are made of silicon carbide. The invention produces a joint (lap plus butt plus tapered) between tube sections, with an silicon carbide collar 14, that is both mechanically strong and hermetic. The primary application of the invention is to bond tube sections to increase the overall length of silicon carbide tubing, which then could be used to replace superalloy tubing as furnace coils in high temperature heat transfer processes. Furnace coils require hermeticity because the tube walls separate the combustion gases from the chemical reaction or heat-treating environment.

Figure 6:
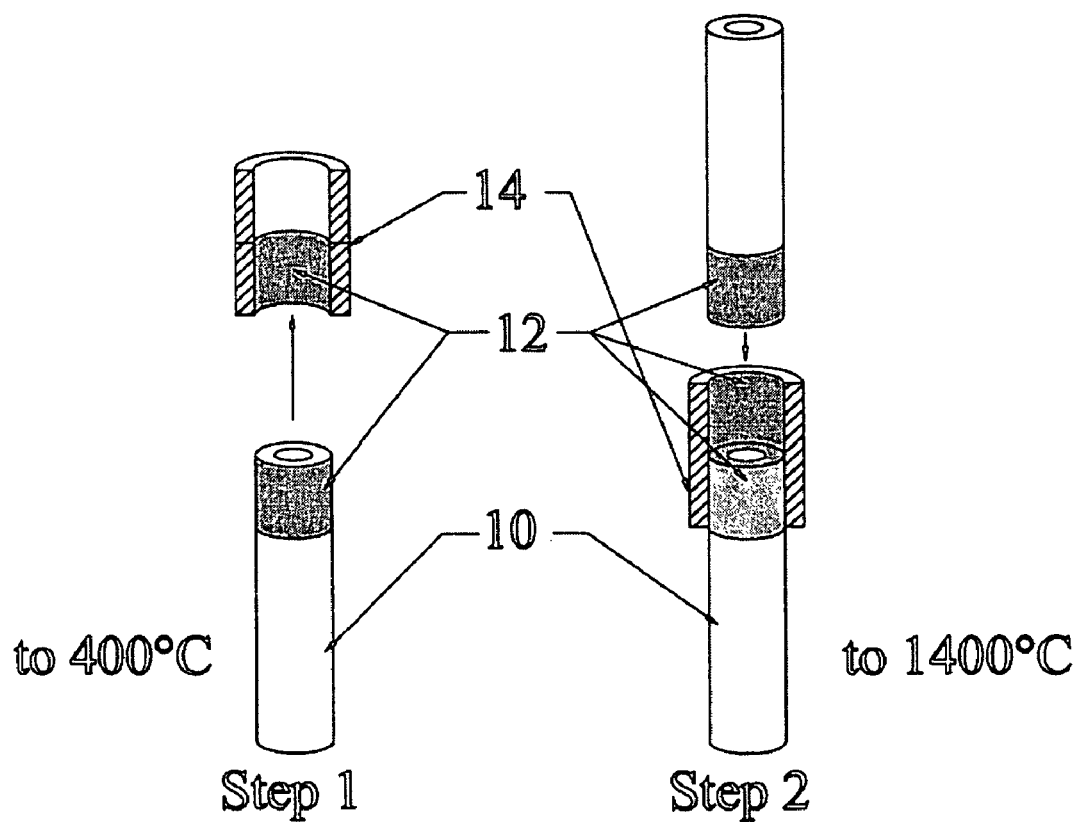
FIG. 6 shows the steps of forming a joint with a collar between ceramic bodies.

The preferred embodiment (FIG. 6) of the invention is described in the following:

- Apply to the tube ends and collar 14 to be joined a slurry 12 formed by mixing a preceramic polymer, which yields silicon carbide when pyrolyzed, with a bimodal silicon carbide powder.
- Assemble the joint and heat to a temperature of 1400 degrees C.
- The heating rate is important, especially at temperatures below 400 degrees C., because too rapid a heating rate can cause bloating, and produce more porosity. Too high a heating rate can also lead to the development of severe cracks in the pyrolyzing polymer. In the preferred embodiment, we heated the joint at 2-3 degrees per minute between room temperature and 400 degrees C. and at 10-20 degrees a minute between 400 degrees C. and 1400 degrees C.
- The heating is done in an inert environment. Static argon was used during processing.

The silicon carbide components to be joined are comprised of two silicon carbide tubes and one silicon carbide collar 14. The silicon carbide tubes are joined together at the tube ends, so the ends should be cut flat to meet. The silicon carbide collar 14 should be machined- to fit over both tubes. Less than 0.010" spacing between the outer radius of the tube and the inner radius of the collar 14 produces a stronger joint.

The slurry 12 is composed of a preceramic polymer and filler material and is prepared in an inert atmosphere, such as Argon. First, the filler material is prepared by mixing 90% by weight, 7 micron alpha silicon carbide powder with 10% by weight, less than 1 micron alpha silicon carbide powder. 60% wt filler material is then mixed with 40% by weight allylhydridopolycarbosilane (AHPCS), the preceramic polymer. The slurry 12 has the consistency of a thick paste, viscosity between 100 and 200 centipoise, which is applied to the inner wall of the silicon carbide collar 14 and outer wall of the silicon carbide tube in the regions to be joined. The bonding slurry 12 is applied to the areas intended to be bonded by a flat toothpick (or it can be a brush, or it could be dipped.) The slurry 12 has the consistency of a thick paste, and it sticks so well to its applied area that it does not have to be contained. The flat toothpick method has the advantage of being able to apply the bonding slurry 12 very thinly, since thinner joints are normally stronger than thicker ones.

The bonding slurry 12 converts completely to silicon carbide. Since this matches the intrinsic material of the joint components if two pieces of silicon carbide are being joined, a strong, stable joint is made. If other materials are joined, like alumina, graphite, or silicon nitride, the silicon carbide that is created from the bonding slurry 12 creates other strong molecular bonds with the material being joined, and mixing in powders (like alumina powder in AHPCS when bonding alumina) that promote stronger bonds in these different materials can help create a more effective joint.

One silicon carbide tube is mated with the silicon carbide collar 14 so that the tube descends halfway in. A standoff is used to keep the tube from sliding all the way to the end of collar 14. There are no requirements for this standoff except that it can handle the temperature and that the bonding slurry 12 does not come into contact with it or else it will bond with it. This assembly is placed in a furnace, collar 14 first, and the furnace is put under vacuum for an hour. The vacuum helps outgas the preceramic polymer at room temperature, so that any volatiles trapped in the preceramic polymer will not be left to create porous areas in the joint during heating.

The furnace is then backfilled with argon. A slight argon flow of 2 liters per minute at 1 atmosphere is introduced into the furnace. The tube and collar 14 with slurry 12 is heated at 2° C. per minute from room temperature to 400° C. At 400° C., the heating rate is changed to 15° C. per minute to 1400° C. The furnace is held at 1400° C. for 30 minutes. The furnace is then cooled at 20° C. per minute to room temperature. The standoff is removed.

The slurry 12 is applied to the outer wall of the unjoined silicon carbide tube in the region to be joined and applied to the inner wall of the collar 14 that is joined. The slurry 12 is also applied to the butt end of both the tube joined to the collar 14 and the unjoined tube. The unjoined tube is mated to the collar 14 so that the butt end of both the joined and unjoined tubes meet. This joint assembly is then put back in the furnace.

The furnace is put under vacuum for an hour then backfilled with argon. A slight argon flow of 2 liters per minute of 1 atmosphere is introduced into the furnace. The joint assembly is heated at 2° C. per minute from room temperature to 400° C. At 400° C., the heating rate is changed to 15° C. per minute to 1400° C. The furnace is held at 1400° C. for 30 minutes. The furnace is then cooled at 20° C. per minute to room temperature.

In regard to the means of heating used to demonstrate this method:
The invention was demonstrated (reduced to practice) using microwave hybrid heating. The chamber was a vacuum-tight multi-mode microwave cavity. The source was a 0-6 kW continuous wave (CW) microwave generator operating at 2.45 GHz. The specimens were placed inside an insulated enclosure that was lined on the inside with a thin layer of a microwave susceptor, to obtain hybrid (microwave plus radiant) heating. This heating method can provide localized (within the enclosure) and uniform heating at low microwave power, and was chosen for that reason. However, other more conventional heating methods, such as oven heating or induction heating, may be used with this invention.

Heating pyrolyzes the polymer to produce silicon carbide, and allows the bimodal silicon carbide powder to reduce the volume shrinkage of the polymer pyrolysis product. The reason that the pyrolyzed polymer has porosity is that gases such as hydrogen and methane are evolved during polymer crosslinking and pyrolysis and there is also volume shrinkage both during the conversion of the polymer to amorphous silicon carbide and during the formation of silicon carbide microcrystals at temperatures above 1000 degrees C.

In regard to the preparation of the tubes and the joining material:
The tubes to be joined were ground with an OD grinder and the collar 14 was ground with an ID grinder so as to fit the tubes inside the collar 14.
Multiple applications of the slurry 12 and heating were required to produce a hermetic joint. This is because the separation distance between the collar 14 and tubes allowed for greater shrinkage of the preceramic polymer during pyrolysis.
The slurry 12 thickness of application is better when a minimally thin but uniform layer is applied.

EXAMPLES

Different chemical mixtures can be used to join the tubes. The use of a preceramic polymer is the principle element. AHPCS is our preferred one, however other ones include hydridopolycarbosilane, polyborosiloxane, and polysilazane. The preceramic polymer may be mixed with silicon carbide powders, particles can be used from 20 nanometers to 35 microns, monomodal (only one particle size), bimodal (two particle sizes), or trimodal (three particle sizes). Other materials that can be joined and slurry 12 are silicon nitride (AHPCS with silicon nitride particulate filler mixed in), graphite (AHPCS with carbon particulate filler mixed in) and alumina (AHPCS with alumina particulate filler mixed in).

Tapers can be built into the tubes, collar 14s or both. Tapers are NOT required for the joining to work, but they are an enhancement.

Example 1

Two reaction bonded silicon carbide tubes measuring 2⅜" OD×2" ID in lengths 1" and 3" are ground on their butt ends mirror flat using a 320 grit diamond plate, then a 600 grit SiC abrasive sandpaper, and finally 6 micron diamond paste.

The bonding slurry 12 is composed of a preceramic polymer and filler material and is prepared in an inert atmosphere, such as Ar. The filler material is prepared mixing 45 wt % 7 micron alpha silicon carbide powder with 5 wt % less than 1 micron alpha silicon carbide powder and 50 wt % active filler material. The active filler material, which is a eutectic alloy powder with particulate size of 45 microns that melts at a temperature of 1330° C., is 83.6 atomic % Si and 16.2 atomic % Ti. 60 wt % filler material is then mixed with 40 wt % allylhydridopolycarbosilane, the preceramic polymer. The slurry 12 has the consistency of a thick paste and is applied using a flat toothpick to the both reaction bonded silicon carbide tubes on their mirror flat butt ends.

The butt ends are pressed together and twisted to ensure coverage on both surfaces of the joint. This butt joint assembly is placed in a furnace and the furnace is put under vacuum for an hour.

The furnace is then backfilled with argon. The butt joint assembly is heated at 2° C. per minute from room temperature to 400° C. At 400° C., the heating rate is changed to 15° C. per minute to 1330° C., the melting temperature of the active filler material in the bonding slurry 12. The furnace is held at 1330° C. for 30 minutes. The furnace is then cooled at 5° C. per minute to 1300° C., to solidify the active filler material slowly, then at 20° C. per minute to room temperature.

Example 2

Two $SiC_f/SiC_m$ (silicon carbide fiber in a silicon carbide matrix) composite plates have dimensions 1"×1"×0.125". Rectangular dovetail joints with dimensions 0.2"×0.2" are machined into a side of one composite plate and rectangular dovetail joints of same dimensions are machined into the other plate to fit both plates together.

The slurry 12 is composed of a preceramic polymer and filler material and is prepared in an inert atmosphere, such as argon. First, the filler material is prepared by mixing 90% by weight, 7 micron alpha silicon carbide powder with 10% by weight, less than 1 micron alpha silicon carbide powder. 60% wt filler material is then mixed with 40% by weight allylhydridopolycarbosilane (AHPCS), the preceramic polymer. The slurry 12 has the consistency of a thick paste and is applied using a flat toothpick to the edges of the dovetail joints to be joined.

Both composite plates are fit together using the machined dovetail joints and placed in a furnace under vacuum for 1 hour. The furnace is then backfilled with argon. A slight argon flow of 2 liters per minute at 1 atm is introduced into the furnace. The plates are heated at 2° C. per minute from room temperature to 400° C. At 400° C., the heating rate is changed to 15° C. per minute to 850° C. The furnace is held at 850° C. to convert all the preceramic polymer in the bonding slurry 12 to amorphous silicon carbide. The furnace is held at 850° C. for 30 minutes. The furnace is then cooled at 20° C. per minute to room temperature.

Example 3

One tube end was joined to the collar 14 using the slurry 12 and heating to 400 degrees C. The other tube end was joined to the previously joined collar 14 and tube and they were heated to 1400 degrees C. The joined tubes were then reinfiltrated with slurry 12 and heated to 1400 degrees C. two more times. The joined tubes were removed from the chamber after heating, tested both under vacuum and under pressure, and demonstrated to be hermetic.

In regard to vertical orientation for tube joining, the tube assembly can be supported by contact with an alumina block. A collar 14 if used can be rested upon an alumina block or ring, which holds the collar 14 at the appropriate height relative to the tubes to be joined.

In regard to horizontal orientation for tube joining, the tube assembly can be supported by alumina V-blocks interior to the furnace and metal V-blocks exterior to the furnace where the tubes extend past the furnace enclosure. The structure should be supported during processing to minimize torsional, twisting, and bending forces at the joint.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method of forming a joint between a first body and a second body comprising the steps of:
   preparing a slurry made of a preceramic polymer and filler material in an inert atmosphere;
   applying the slurry to a male tapered area of a first cylindrical body of a non-oxide ceramic and with a taper angle that is less than a female taper angle of a second cylindrical body;
   applying the slurry to the female tapered area of a second cylindrical body of a non-oxide ceramic;
   applying the slurry to a collar;
   aligning the tapered area of the first cylindrical body with the tapered area of the second cylindrical body with the collar around the first cylindrical body and the second cylindrical body; and
   heating the first cylindrical body and the second cylindrical body and the collar with the slurry in the range from 850 degrees centigrade up to 1400 degrees centigrade which forms a joint.

2. A method as described in claim 1 wherein there is less than .010" spacing between each tube's outer radius and the collars' inner radius.

3. A method as described in claim 2 wherein the applying the slurry step includes the step of applying a slurry of silicon carbide powder having a particle size between 20 nanometers and 35 microns to the first cylindrical body of a non-oxide ceramic whereby the non-oxide ceramic material of the first cylindrical body is silicon carbide.

4. A method as described in claim 3 wherein the applying the slurry step includes the step of applying a slurry of silicon carbide powder having at least two distinct particle sizes.

* * * * *